United States Patent [19]

Faussone

[11] Patent Number: 5,120,161
[45] Date of Patent: Jun. 9, 1992

[54] APPARATUS FOR THE CONTROLLED DISPOSAL OF WASTE AND METHOD THEREFOR

[75] Inventor: Elio Faussone, Cunico, Italy

[73] Assignee: Servizi Ecologici S.p.A., La Loggia, Italy

[21] Appl. No.: 650,319

[22] Filed: Feb. 4, 1991

[30] Foreign Application Priority Data

Apr. 18, 1990 [IT] Italy .................. 67286 A/90

[51] Int. Cl.⁵ .................................................. B09B 1/00
[52] U.S. Cl. ............................ 405/129; 241/DIG. 38
[58] Field of Search .......................... 405/128, 129; 241/DIG. 38; 210/603

[56] References Cited

U.S. PATENT DOCUMENTS

| | | | |
|---|---|---|---|
| 3,970,255 | 7/1976 | Foster | 241/186 R |
| 4,670,148 | 6/1987 | Schneider | 210/603 |
| 4,696,599 | 9/1987 | Rakoczynski et al. | 405/129 |
| 4,748,905 | 6/1988 | Langdon | 100/90 |
| 4,838,733 | 6/1989 | Katz | 405/129 |

FOREIGN PATENT DOCUMENTS

| | | | |
|---|---|---|---|
| 3031525 | 3/1982 | Fed. Rep. of Germany. | |
| 3131100 | 2/1984 | Fed. Rep. of Germany. | |
| 3425785 | 1/1986 | Fed. Rep. of Germany | 405/128 |
| 3425788 | 1/1986 | Fed. Rep. of Germany | 405/128 |
| 20215 | 2/1981 | Japan | 405/129 |
| 90/03232 | 4/1990 | PCT Int'l Appl. | |

*Primary Examiner*—Randolph A. Reese
*Assistant Examiner*—John A. Ricci
*Attorney, Agent, or Firm*—Guido Modiano; Albert Josif

[57] ABSTRACT

The apparatus includes a controlled deposition region constituted by a pit lined with an impermeable lining of heat-weldable polymeric material. Partitioning sheets made of polymeric material which are perimetrically welded to the lining, separate, in the pit, a plurality of superimposed sealed compartments in which the shredded waste is fed by means of a feed hose which can be switched to a vacuum source in order to compact the shredded waste fed into the compartment.

20 Claims, 3 Drawing Sheets

APPARATUS FOR THE CONTROLLED DISPOSAL OF WASTE AND METHOD THEREFOR

BACKGROUND OF THE INVENTION

The present invention relates to an apparatus for the controlled disposal of waste, particularly solid urban waste, and to the method therefor.

Current systems for the controlled disposal of solid waste use opencast pits lined with an impermeable covering in which the waste is accumlated by successive stratifications, interposing layers of soil or inert material between layers of waste; once the stratification is completed, the pit is covered with a final layer of agricultural soil suitable for allowing the planting of tree species and the like which permanently conceal the pit and its contents.

This known system for the controlled disposal waste has several disadvantages which mainly include the following:

high management costs arising from the need to use labor and machinery for the distribution and compaction of the successive superimposed layers of waste and soil, presence of percolates which must be drained and eliminated with expensive filtration, reclamation and disposal systems, presence of exhalations produced by the open-air fermentation of decomposing organic substances and consequent concentration of animal populations such as rats, birds and harmful insects also in the areas surrounding the pit, possibility of unlawful sorting of the stratified waste, presence of airborne waste consequent both to the action of winds and to the accidental conveyance thereof performed by the transportation vehicles and by the compaction machines, difficulty in carrying out and controlling possible processes of biochemical degradation of the waste for the production of recovered biogas to be used for combustion, impossibility of recovering the screenable organic fraction which derives from the fermentation processes and can be used in agriculture for fertilization.

SUMMARY OF THE INVENTION

The aim of the present invention is to eliminate these considerable disadvantages.

In particular, an important object of the present invention is to provide an apparatus for the controlled disposal of waste and to the method therefor with fully automated operation which is totally free from the use of auxiliary machinery for distribution and compaction and is therefore economically advantageous, also by virtue of the absence of labor assigned to said machinery.

Another important object of the present invention is to provide an apparatus with elevated ecological characteristics obtained from the elimination of opencast stratification operations, thus avoiding the attraction and concentration of animal population, eliminating noxious and polluting exhalations, and avoiding the accidental spreading of waste during accumulation.

A further object of the present invention is to provide an apparatus which allows the complete control of the processes of biological degradation of the organic fraction of the waste and also allows to act chemically on said processes in order to obtain a product which can be recycled for use in agriculture and/or for the possible production of gas to used for combustion.

In order to achieve this aim, these important objects and others which will become apparent from the following detailed description, the present invention provides an apparatus for the controlled disposal of waste, characterized in that it comprises a controlled waste dumping region, elastically yielding partitioning means for separating, in said region, sealed compartments intended to receive the waste, waste shredding means arranged adjacent to the dumping region, pressurized feeding means for feeding the shredded waste into said sealed compartments and vacuum generation means connectable to the sealed compartments for the compaction of the waste contained therein.

According to an embodiment of the invention, the controlled dumping region for the dumping of waste is constituted by a pit which is at least partially lined, also for impermeabilization purposes, with a layer of heat-weldable calendered polymeric material in which sealed compartments ordered in a superimposed arrangement are delimited by means of sheets of a similar polymeric material which are welded perimetrically to the lining of the pit or to lining strips arranged at preset levels; each sheet being provided with filtering openings, provided with cutoff and connection means, which are distributed on the surface of said sheet and which are suitable for receiving waste feeding hoses and for connecting to the vacuum source.

The method according to the invention comprises the following operating steps:

forming, in the lined disposal pit, a first sealed compartment by heat-welding a partitioning sheet to the lining which lines the pit, distributingly introducing the shredded waste into said sealed compartment with filtered removal of the air and of the gases through the filtering openings which are not engaged by the feed hose or hoses, up to the complete filling of the sealed compartment, optionally introducing chemical and/or bacterial additives for the decomposition of the organic fraction of the waste, switching the feed hose or hoses from the pressurized feeding means for feeding the waste to the vacuum generation means after the sealed closure of the unused openings, compacting the shredded waste, with the optional introduction of additives, by vacuum, which is preferably applied intermittently, uncoupling the compartment from the vacuum source, closing all the openings and forming, by welding of successive sheets, sealed compartments which are progressively superimposed on the first one until the dumping region is completely filled.

After an adequate fermentation period, the compartments can be opened, by tearing the sheets which delimit them, to recover the recyclable portion, whereas the inert portion is discarded and sent to incinerators.

BRIEF DESCRIPTION OF THE DRAWINGS

Further characteristics, purposes and advantages will become apparent from the following detailed description and with reference to the accompanying drawings, given by way of non-limiting example, wherein.

DESCRIPTION OF THE PREFERRED EMBODIMENTS

Figure 1:
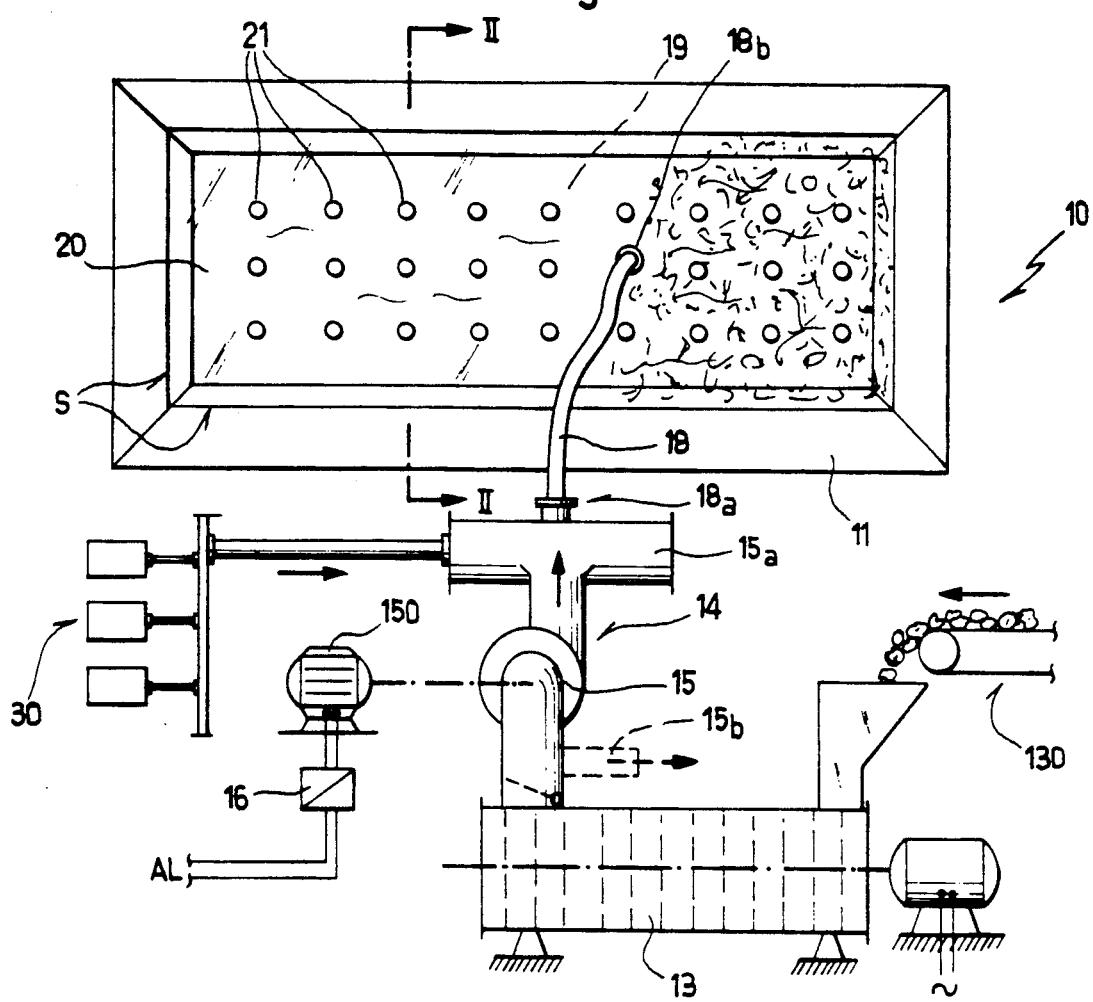
FIG. 1 is a schematic plan view of the apparatus according to the invention.
Figure 2:
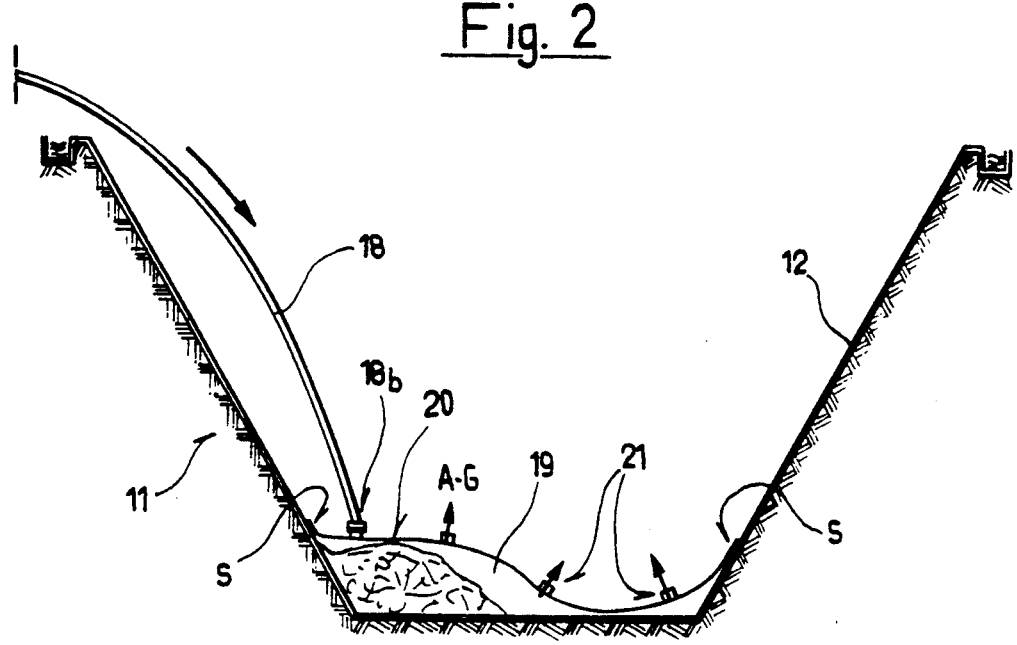
FIG. 2 is an enlarged-scale sectional view taken along the line II—II of FIG. 1, illustrating the procedure of feeding the first sealed compartment inside a waste dumping pit and the step of filling said compartment.
Figure 3:
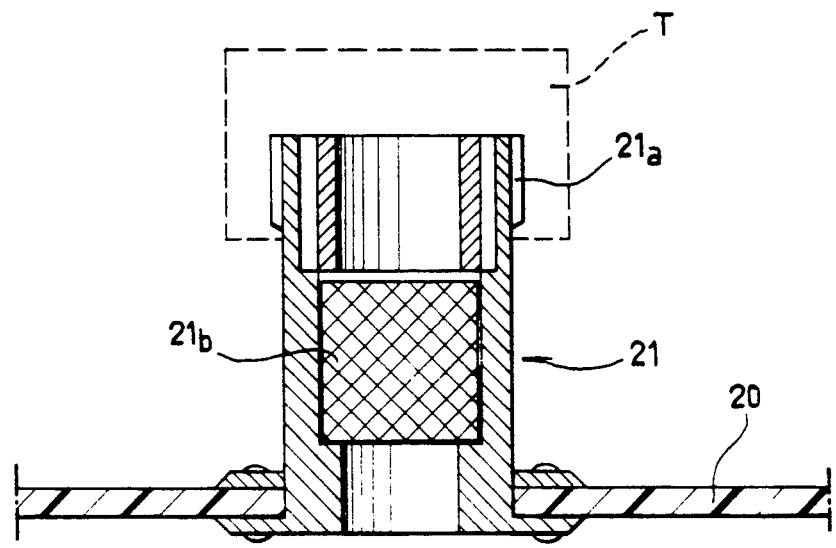
FIG. 3 is an enlarged-scale sectional view of a filtering opening.

In FIG. 1, the reference numeral 10 indicates the controlled waste dumping region, which is constituted for example by a pit 11 with a trapezoidal cross section, on the walls of which an impermeable lining 12, constituted for example by a continuous layer obtained by laying and welding calendered sheets of thermoplastic polymeric material, advantageously polyethylene, is arranged.

A waste shredding unit 13 of a type per se known, for example with superimposed cylinders, a so-called "crushing roll", capable of shredding the waste into granular elements with a diameter comprised between 2 and 3 mm, is arranged proximate to the pit 11.

A belt screening and conveyance system 130 receives the unshredded waste from the transportation vehicles and feeds it to the shredding unit 13. The outlet of the unit 13 is operatively connected to a pressurized conveyance unit 14, for example of the reversible pneumatic type, used for the conveyance of loose materials such as middlings and the like, provided with rotor blowers 15 capable of imparting to the shredded waste and for one direction of rotation of the impellers conveyance speeds comprised between 3 and 10 meters per second.

A polarity switching device 16 is associated with the power supply AL of the motors 150 which drive the blowers 15 to allow the reversal of their direction of rotation in order to selectively use the unit 14 as a vacuum generation device suitable for producing a negative pressure in the delivery manifolds 15a of said blowers. As an alternative to the reversible pneumatic unit 14 it is possible to use a device for the mechanical conveyance of shredded waste, for example of the scroll type, with which a vacuum generator, which can be selectively switched on the delivery manifolds of the scroll device, is associated.

An opening 18a for the connection of at least one tubular member or hose for the distribution of the shredded waste into sealed compartments 19-19a etc. which are defined, in successive stratifications, in the dumping pit 11, is arranged on said delivery manifolds 15a of the blowers 15 or of the scroll device.

Each compartment 19 is delimited, in the pit by sheets 20-20a etc. made of polymeric material which are heat-welded, by means of welding seams S, to the lining 12 of the pit and are optionally retained, in order to limit deformation in a vertical direction, by flexible tension elements which are fixed to the base of the pit and subsequently to the underlying sheet. The sheets 20 have openings 21 with connecting elements which are suitable for receiving a corresponding connection member 18b provided at the free end of the distribution hose 18. The openings 21 are preferably provided with a threaded portion 21a, which is suitable for receiving a corresponding threaded ring-type connection member of the hose 18 or a sealing closure plug T advantageously made of wood or of another biodegradable material, and have a filter 21b, for example of the carbon type, which is capable of actively purifying the air and gases which escape outward during the introduction of the shredded waste into the compartments 19.

Figure 4:
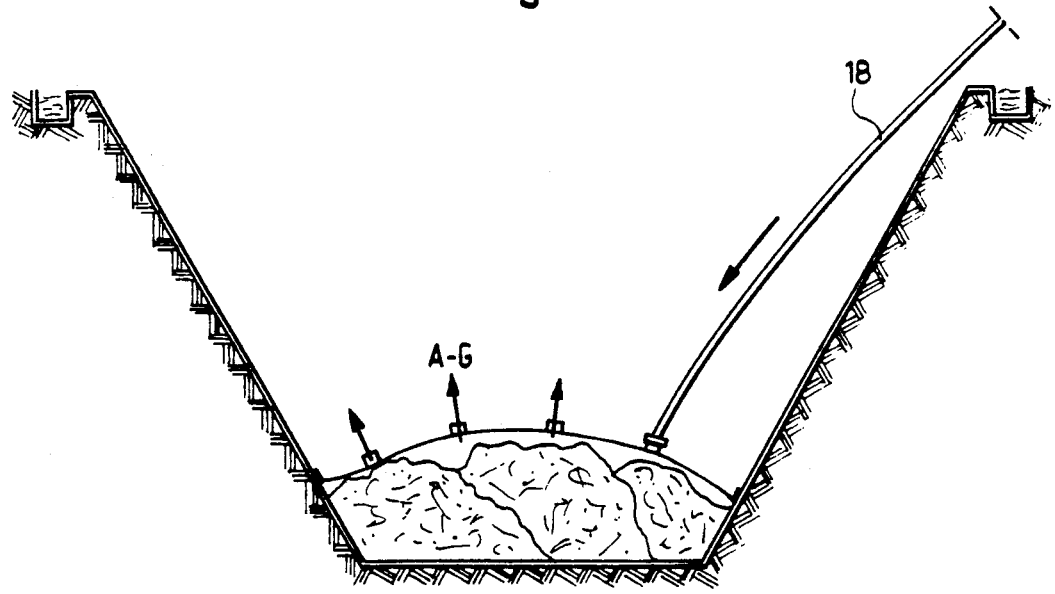
FIG. 4 is a sectional view, similar to FIG. 2, illustrating the sealed compartment when completely filled with waste.

For a correct distribution of the waste, the hose 18 is progressively connected to the various openings 21 which are arranged uniformly on the entire surface of the sheet 20; the openings which are not connected to the hose are kept open to allow the escape of the air A and of the gases G. Once the filling has been completed as shown in FIG. 4, the openings 21 are closed except for the one which is connected to the hose 18, and the manifold 15a of the conveyance means is switched to the vacuum generator associated with the unit 14.

If the unit 14 is of the type with pneumatic blowers as specified, this is obtained simply by reversing the direction of rotation of the impellers by means of the device 16; the drawn air is expelled by an auxiliary manifold 15b.

Figure 5:
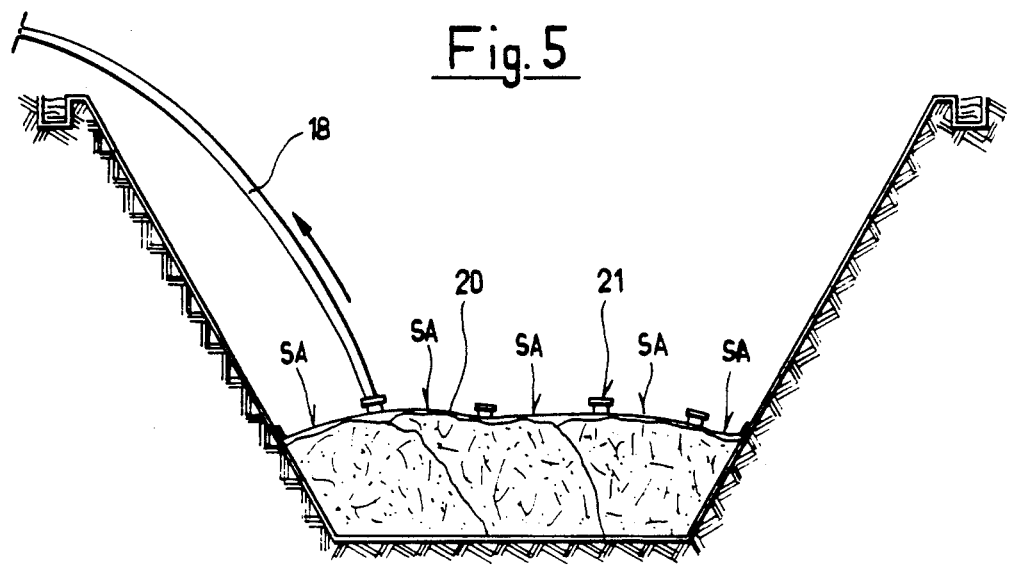
FIG. 5 is a sectional view, similar to the preceding ones, illustrating the subsequent step of compaction of the waste fed into the compartment.

The compartment 19 is thus put under negative pressure and this causes the crushing and compaction of the waste by means of the sheet 20 which is subjected to the atmospheric overpressure SA which acts on the outer surface of said sheet (FIG. 5). In order to facilitate the compaction action, the vacuum can also be applied intermittently.

Figure 6:
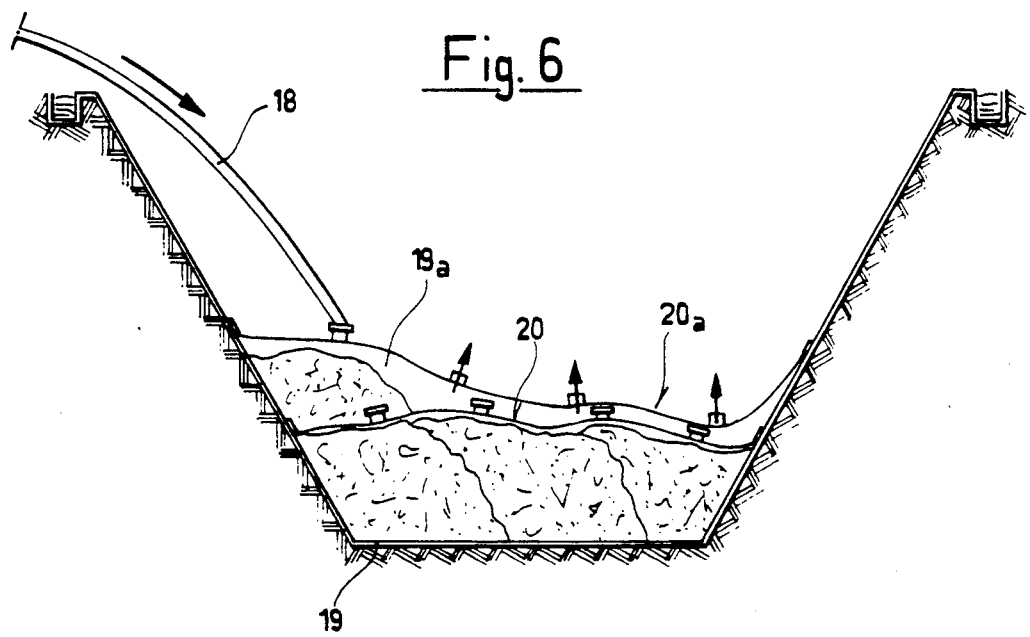
FIG. 6 is a sectional view, similar to the preceding ones, illustrating the successive steps of forming and filling of further sealed compartments superimposed on the first one.

Once compaction is completed, the hose 18 is disconnected from the opening 21, said opening is closed by means of the related sealing plug and the delimitation of a successive superimposed compartment such as 19a (FIG. 6) is performed by means of the laying and welding of a successive sheet 20a. The volume of the successive superimposed compartments is preferably chosen constant.

The filling and compaction of the successive superimposed compartments is then performed in the previously described manner until the volume of the pit 11 is completely used.

Chemical and/or bacteriologically active and/or cementing and/or inertizing substances can be added to the flow of shredded waste fed into the various superimposed compartments 19. A host of dispensers 30 of said substances is advantageously provided to feed them into the manifold 15a of the blowers or, as an alternative, into the scroll distributor of the waste.

After an adequate period of permanence in the compartments 19, the material can be removed from said compartments for the recovery of the recyclable organic fraction, whereas the inert fraction is sent to incineration, or the controlled dumping region can be covered with a layer of agricultural soil for planting or cultivation.

Figure 7:
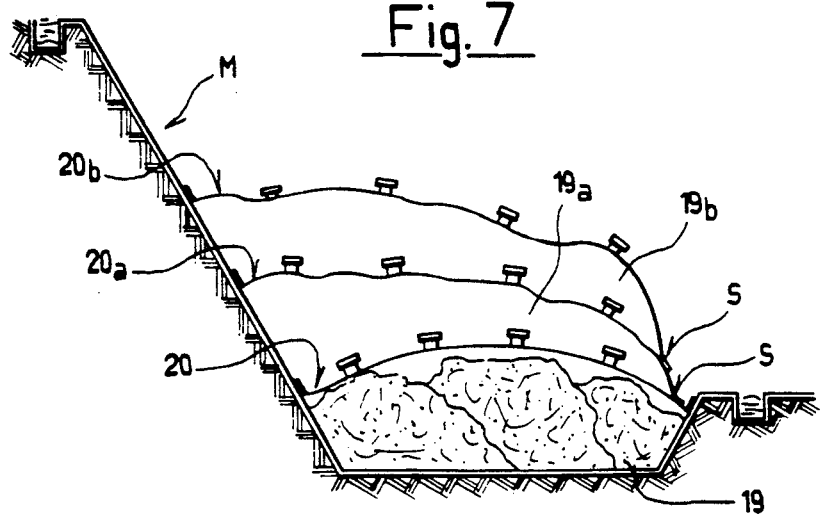
FIG. 7 is a sectional view of a dumping pit according to a further embodiment of the invention.

If the controlled dumping region is located in steep hilly regions which do not allow the delimiting of pits but only of barriers with an uphill wall M as shown in FIG. 7, the subsequent sheets 20-20a-20b for delimiting the sealed compartments 19-19a-19b are welded to the lining of the wall M along one of their sides and to the immediately underlying sheet along the remaining three sides, as indicated by S in said FIG. 5.

The controlled dumping region can also be constituted by suspended containers if it is located in soils which are marshy or sandy or in any case soils not permitting excavation, and in this case said controlled dumping region assumes the structure of one or more containers supported by pillars or pilings made of steel or cement mix or with a mixed steel-cement structure.

For this type of structure, as well as in the case of pits which do not require impermeabilization, it is possible to provide a partial lining constituted only by portions made of strips of heat-weldable material arranged at preset levels for the heat-welding of the sheets 20 for delimiting the compartments 19.

The details of execution and the embodiments may naturally be varied extensively with respect to what is described and illustrated by way of non-limiting example without thereby abandoning the scope of the invention and without altering its concept.

In particular, the sheets 20 which delimit the compartments 19 can be coupled to the walls of the pits in a different manner, for example by embedding their edge in corresponding channels which are defined on the walls which delimit the controlled dumping region and are filled with inert material or cement-like material. It is also possible to nail the edge of the sheets to the walls which delimit the controlled dumping region after interposing a sealing gasket.

I claim:

1. Apparatus for controlled disposal of solid urban waste including urban waste treatment means and urban waste storage means,
wherein said urban waste storage means comprise;
   a pit having walls and a bottom;
   an impermeable lining covering said walls and said bottom of said pit;
   a plurality of superimposed sheets sequentially connected to said lining and defining therewith a plurality of superimposed compartments;
   a plurality of openings provided in each of said sheets;
   a plurality of sealing plugs closing said openings; and
   wherein said urban waste treatment means comprise;
   a waste shredding unit having an outlet;
   means for conveying waste to said shredding unit;
   a pressurized conveyance unit connected to said outlet of said shredding unit;
   vacuum generating waste compacting means;
   at least one tubular member selectively connectable to said pressurized conveyance unit and to said vacuum generating means;
   at least one free end defined by said tubular member, and;
   a connection member connected to said free end of said tubular member and being sequentially connectable to each of said openings upon temporary removal of said sealing plugs,
whereby said compartments are sequentially filled with compacted urban waste to fill said pit without exposing the urban waste to the atmosphere.

2. Apparatus according to claim 1, wherein said means for conveying comprise a belt screening and conveyance system.

3. Apparatus according to claim 1, wherein said pressurized conveyance unit comprises a reversible pneumatic compression unit, said compression unit having rotor blowers provided with rotatable impellers.

4. Apparatus according to claim 3, wherein said impellers impart to shredded waste exiting said outlet of said waste shredding unit a conveyance speed comprised between 3 and 10 meters per second.

5. Apparatus according to claim 1, wherein said openings are arranged uniformly on a surface of said sheet and wherein said sealing plugs are made of biodegradable material.

6. Apparatus according to claim 1, wherein each of said openings have connected thereto at least one filter, each said filter being adapted for purifying air escaping through said openings during filling of said compartments.

7. Apparatus according to claim 6, wherein each said filter comprises at least one carbon filter.

8. Apparatus according to claim 1, wherein said vacuum generating waste compacting means comprise intermittently activatable vacuum generating means, whereby to enhance compression of said waste.

9. Apparatus for controlled disposal of solid urban waste including urban waste treatment means and urban waste storage means,
wherein said urban waste storage means comprise;
   a pit having walls and a bottom;
   an impermeable lining covering said walls and said bottom of said pit;
   a plurality of superimposed sheets sequentially connected to said lining and defining therewith a plurality of superimposed compartments;
   a plurality of openings provided substantially uniformly on each of said sheets;
   a plurality of biodegradable sealing plugs closing said openings;
wherein said urban waste treatment means comprise;
   a waste shredding unit having an outlet;
   means for conveying waste to said shredding unit;
   a pressurized conveyance unit connected to said outlet of said shredding unit;
   vacuum generating waste compacting means;
   at least one tubular member selectively connectable to said pressurized conveyance unit and to said vacuum generating means;
   at least one free end defined by said tubular member, and;
   a connection member connected to said free end of said tubular member and being sequentially connectable to each of said openings upon temporary removal of said sealing plugs,
and wherein each of said openings have connected thereto a plurality of filters, said filters purifying air and gasses escaping through said openings during filling of said compartments,
whereby said compartments are sequentially filled with compacted urban waste to fill said pit without exposing the urban waste to the atmosphere.

10. Apparatus according to claim 9, wherein said means for conveying comprise a belt screening and conveyance system.

11. Apparatus according to claim 9, wherein said pressurized conveyance unit comprises a reversible pneumatic compression unit, said compression unit having rotor blowers provided with rotatable impellers.

12. Apparatus according to claim 11, wherein said impellers impart to shredded waste exiting said outlet of said waste shredding unit a conveyance speed comprised between 3 and 10 meters per second.

13. Apparatus according to claim 9, wherein said openings are arranged uniformly on a surface of said sheet and wherein said sealing plugs are made of biodegradable material.

14. Apparatus according to claim 9, wherein each said filter comprises at least one carbon filter.

15. Apparatus according to claim 9, wherein said vacuum generating waste compacting means comprise intermittently activatable vacuum generating means, whereby to enhance compression of said waste.

16. Method for controlled disposal of solid urban waste including urban waste comprising the steps of;

excavating a pit;

lining said pit with an impermeable membrane;

sealingly connecting a first sheet to said impermeable membrane to define therebetween a first compartment;

providing a plurality of openings in said first sheet;

shredding urban waste to be disposed of;

conveying shredded waste successively through each of said openings whereby to fill said first compartment with shredded urban waste;

connecting a vacuum source to one of said openings;

closing all remaining openings;

applying a negative pressure whereby to cause compaction of said shredded urban waste;

disconnecting said vacuum source;

closing said one of said openings;

superimposing at least one further sheet on said first sheet, whereby said first sheet defines an underlying sheet;

sealingly connecting said at least one further sheet to said underlying sheet to define therebetween at least one further compartment;

providing a plurality of openings in said further sheet;

shredding more urban waste to be disposed of;

conveying the shredded waste successively through each of said openings in said at least one further sheet whereby to fill said at least one further compartment with shredded urban waste;

connecting a vacuum source to one of said openings in said further sheet;

closing all remaining openings in said further sheet;

applying a negative pressure whereby to cause compaction of said shredded urban waste;

disconnecting said vacuum source;

closing said one of said openings in said further sheet;

thereby sequentially filling said compartments with compacted urban waste and filling said pit without exposing the urban waste to the atmosphere.

17. Method according to claim 16, wherein said step of conveying shredded waste includes the step of imparting to the shredded waste a conveyance speed comprised between 3 and 10 meters per second.

18. Method according to claim 16, further comprising the intermediate step of connecting at least one filter to each of said openings prior to said step of conveying shredded waste successively through each of said openings, thereby purifying air escaping through said openings during filling of each said compartment.

19. Method according to claim 18, further comprising the step of providing at least one carbon filter on each of said openings.

20. Method according to claim 16, wherein said step of applying a negative pressure whereby to cause compaction of said shredded urban waste includes the intermediate step of intermittently activating said vacuum source whereby to enhance compression of said waste.

* * * * *